United States Patent [19]
Black et al.

[11] Patent Number: 6,147,964
[45] Date of Patent: Nov. 14, 2000

[54] METHOD AND APPARATUS FOR PERFORMING RATE DETERMINATION USING ORTHOGONAL RATE-DEPENDENT WALSH COVERING CODES

[75] Inventors: Peter J. Black, La Jolla, Calif.; Jeremy M. Stein, Tel Aviv, Israel

[73] Assignee: Qualcomm Inc., San Diego, Calif.

[21] Appl. No.: 09/075,406

[22] Filed: May 7, 1998

[51] Int. Cl.[7] .................................................. H04J 13/00
[52] U.S. Cl. ........................................ 370/209; 370/342
[58] Field of Search ................................... 370/208, 209, 370/252, 342; 375/142, 145, 149

[56] References Cited

FOREIGN PATENT DOCUMENTS

| | | | |
|---|---|---|---|
| 9501032 | 1/1995 | WIPO | H04L 25/02 |
| 9503652 | 2/1995 | WIPO | H04B 7/26 |
| 9508888 | 3/1995 | WIPO | H04L 25/02 |

OTHER PUBLICATIONS

Koichi Okawa and Fumiyuki Adachi, Orthogonal Multi-Spreading Factor Forward Link for Coherent DS–CDMA Mobile Radio, 1997 IEEE, pp. 618–622.

*Primary Examiner*—Melvin Marcelo
*Attorney, Agent, or Firm*—Philip Wadsworth; Thomas R. Rouse; Bruce W. Greenhaus

[57] ABSTRACT

A method and apparatus for rate determination in a communication system using orthogonal rate-dependent Walsh covering codes. Orthogonal rate-dependent Walsh codes are used to cover repeated code symbols prior to transmission over a communication link. In one embodiment, the Walsh codes comprise orthogonal binary codes that increase by powers of two for each data rate used in the system. Code symbols are repeated and then covered at the symbol rate using the inventive orthogonal Walsh codes. The inventive code symbol repetition and encoding method and apparatus is particularly advantageous in encoding data that contains long sequences of logical zeros and ones. The orthogonal nature of the code symbols encoded in accordance with the present invention allows use of a more accurate and less complex data rate determination apparatus in the receiver. Rate determination is thereby improved resulting in an improvement in data service capability and a reduction in decoding errors. In one embodiment, symbol error rate (SER) blocks are used to generate rate-dependent SER metrics for each of the candidate rates. SER estimators associated with soft combiners using incorrect data rate hypotheses produce high symbol error rates with respect to the symbol error rate produced by the SER estimator associated with the soft combiner using the correct rate hypothesis. In another embodiment of the data rate determination and decoding method and apparatus of the present invention, energy metric calculators are used to generate rate-dependent re-encoded energy metrics for each candidate data rate. The energy metrics produce an estimate of the symbol energy. The symbol energy is used as another data rate indicator.

31 Claims, 7 Drawing Sheets

METHOD AND APPARATUS FOR PERFORMING RATE DETERMINATION USING ORTHOGONAL RATE-DEPENDENT WALSH COVERING CODES

BACKGROUND OF THE INVENTION

I. Field of the Invention

This invention relates to code division multiple access (CDMA) communications, and more particularly to rate determination in a high capacity CDMA telecommunication system.

II. Description of Related Art

Wireless communication systems facilitate two-way communication between a plurality of subscriber mobile radio stations or "mobile stations" and a fixed network infrastructure. One exemplary system is the well-known Code Division Multiple Access (CDMA) communication system. CDMA systems use unique code sequences to create communication channels in a spread-spectrum multiple-access digital communications system. The operation and functionality of CDMA systems is set forth in the Telecommunications Industry Association (TIA) specification governing CDMA operations, entitled "Mobile Station-Base Station Compatibility Standard for Dual-Mode Wideband Spread Spectrum Cellular System," TIA/EIA/IS-95-A, published in May 1995 by the Telecommunications Industry Association, incorporated herein by reference, and referred to hereafter as "IS-95".

Figure 1:
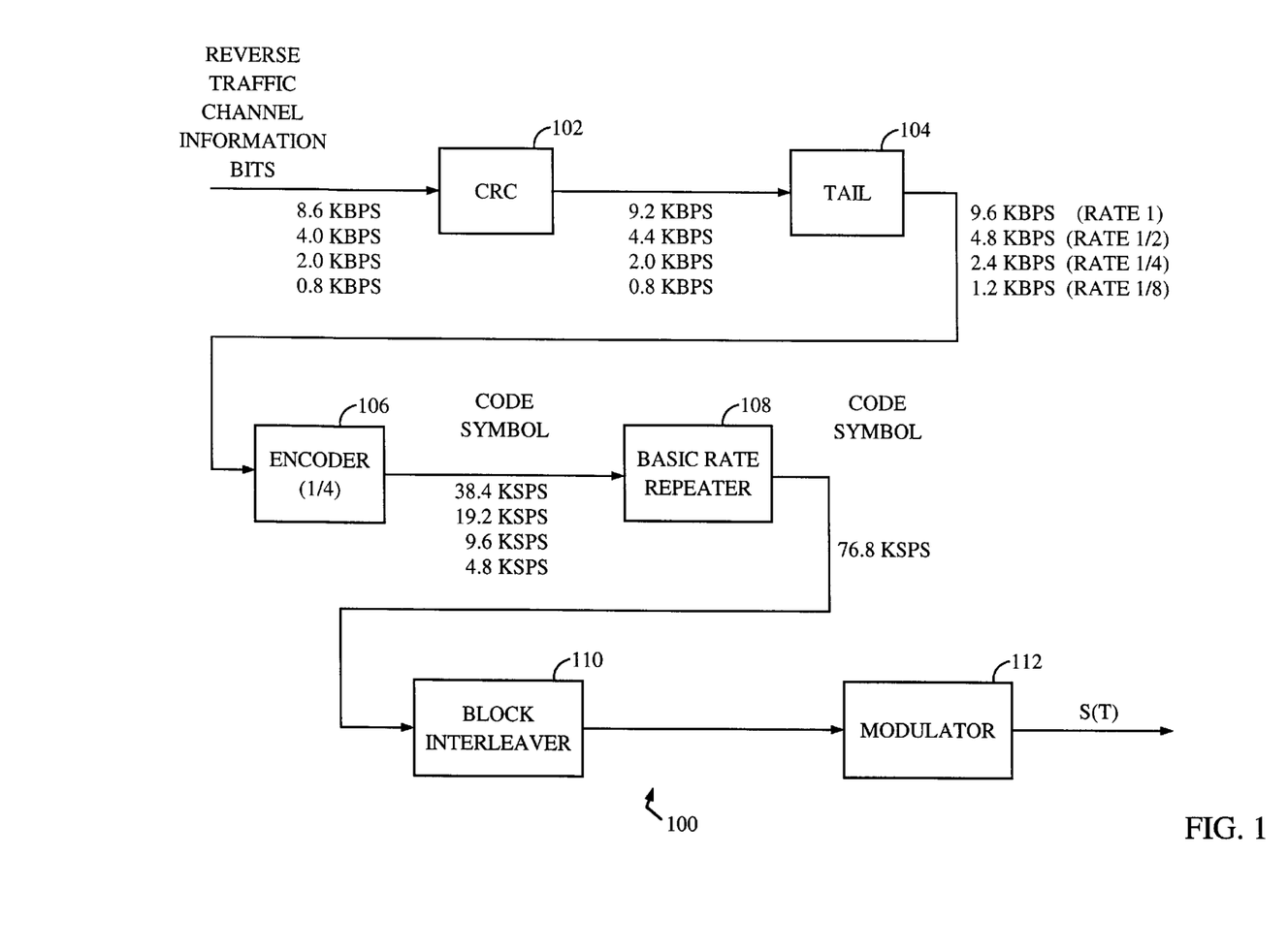
FIG. 1 is a block diagram showing the overall structure of an exemplary coherent reverse link CDMA traffic channel.

Communications from CDMA base stations to CDMA mobile stations use "forward CDMA channels" while communications from mobile stations to base stations use "reverse CDMA channels." The CDMA channels comprise access channels and traffic channels. These channels share the same CDMA frequency assignment using direct-sequence CDMA techniques. A distinct user channel long code sequence number identifies each traffic channel. The overall structure of a coherent reverse link CDMA traffic channel is shown in FIG. 1. A proposed forward link traffic channel that can be adapted for use with the present invention is similar to the reverse traffic channel of FIG. 1 and is described in more detail below. Data transmitted on the reverse CDMA channel is grouped into 20 ms frames. As shown in FIG. 1, prior to transmission, the reverse channel information bits are appended with cyclic redundancy codes (CRC) and "tail" bits. The information and tail bits are then encoded using a conventional encoding method to generate code symbols. Each code symbol is preferably a digital bit of information. In one exemplar of an encoder, four bits are output for each one bit that is input. Such encoders are typically referred to as ¼ encoders. In one particular case, convolutional encoders are used to generate code symbols. The code symbols are repeated, block interleaved, and modulated prior to transmission. Each of the components in the reverse link traffic channel structure 100 is briefly described below.

In the exemplary CDMA traffic channel structure shown in FIG. 1, the data frames may be selectively transmitted on the reverse traffic channel at "basic" data rates of 9600 ("rate 1"), 4800 ("rate ½"), 2400 ("rate ¼") and 1200 ("rate ⅛") bits-per-second. Higher data rates, such as 19.2 kbps ("rate 2"), 38.4 kbps ("rate 4") and 76.8 kbps ("rate 8"), may be supported by modifying the reverse traffic channel structure shown. An example of such an alternative reverse traffic channel is described below with reference to FIG. 7. The basic data rates are generated after frame quality indicators and encoder "tail bits" are added to the information bits by blocks 102 and 104, respectively. The frame quality indicators comprise cyclic redundancy codes (CRC) which support two functions: (1) assist in determination of whether a frame is transmitted in error, and (2) assist in the determination of the transmitted data rate in the receiver. The number of CRC bits added depends upon the basic data rate being used.

Other rate determination metrics are required to perform data rate determination in the receiver. In some systems, not all frames contain CRCs. For example, in the structure of FIG. 1, the two lowest data rates (1.2 and 2.4 kbps rates) do not include CRC information. In addition to the CRC information, symbol error rates (SER) evaluated at the four candidate basic data rates have been used for rate determination. In addition, prior art systems have used energy metrics to aid rate determination in the receiver. Disadvantageously, due to correlation in data transmitted at the various rates (especially for long zero strings), data rate determination has proven difficult using these rate determination metrics.

The encoder tail bits are simply eight logical zeros that are appended to the end of each frame. The tail bits are appended to frames by the encoder tail block 104. The data frames are input to an encoder block 106 as shown in FIG. 1. The reverse channel may use any of the candidate basic data rates to transmit data. The basic data frames comprise 24 bits (for 1.2 kpbs data rate), 48 bits (for 2.4 kbps), 96 bits (for 4.8 kbps) and 192 bits (for 9.6 kbps). The encoder 106 can be implemented using any convenient well known encoding technique. For example, a convolutional encoder can be used to implement the encoder 106 of FIG. 1. In this case, the convolutional code is preferably rate ¼ and preferably has a constraint length of 9. The encoder 106 generates code symbols that are input to a basic rate repeater 108 as shown in FIG. 1.

The basic rate repeater 108 repeats the information which is encoded at the lower rates to ensure transmission at a fixed rate. Consequently, the over-the-air transmission rate is the same for every user regardless of the rate at which actual information is being transmitted. The basic rate repeater 108 repeats the code symbols before they are interleaved. In the reverse link traffic channel structure 100 shown in FIG. 1, each code symbol at the 9.6 kbps rate is repeated once (i.e., each symbol occurs two consecutive times). Each code symbol at the 4.8 kbps rate is repeated thrice (i.e., each symbol occurs four consecutive times). Each code symbol at the 2.4 kbps rate is repeated seven times (i.e., each symbol occurs eight consecutive times). Each code symbol at the 1.2 kbps rate is repeated fifteen times (i.e., each symbol occurs sixteen consecutive times). This results in a constant code symbol rate of 76,800 code symbols per second. The repeated code symbols generated by the basic rate repeater 108 are input to the block interleaver 110 prior to transmission.

The block interleaver 110 functions in a well-known manner to create a pseudo-random temporal separation between adjacent code symbols. The block interleaver 110 distributes the code symbols over a period of time to make the transmitted data more robust and thereby more resistant to bursty errors and adverse channel fading characteristics. This ensures that data can be accurately transceived under a variety of adverse channel conditions. The code symbols are modulated by the modulator 112 prior to transmission.

Disadvantageously, the reverse link traffic channel structure shown in FIG. 1 makes rate determination at the receiver very difficult to perform. Because symbols are simply repeated by the basic rate repeater 108, rather than encoded or covered, the de-interleaved codes are highly correlated among the different data rates, especially when the codes produce long strings of logical zeros or ones. The zero strings are highly correlated because the same zero strings are produced by the basic rate repeater 108 when using any of the candidate basic data rates. For example, a rate ¼ all-zeros code repeated eight times will appear the same as a rate ½ all-zeros code repeated four times. The same zero string is generated by the basic rate repeater 108 in both cases. Disadvantageously, the two code symbol sequences will cause receivers to error when attempting to determine the rate at which the data is transmitted. The rate determination errors create problems at the receiver and thereby produce decoding errors. Therefore, an improved traffic channel structure including a rate covering technique is needed to facilitate rate determination in the receiver.

Further, the prior art data rate determination metrics have failed to produce reliable results especially when the data contains long strings of zeros or ones. Therefore, a technique is required which will improve the performance of the prior art data rate determination metrics.

The present invention provides such an improved rate determination method and apparatus.

SUMMARY OF THE INVENTION

A novel method and apparatus for data rate determination in a wireless communication system is disclosed herein. In accordance with one embodiment of the method and apparatus disclosed herein, orthogonal rate-dependent Walsh codes are used to cover sequences of code symbols prior to transmission over a communication link. The Walsh codes increase in length by powers of two for successively lower data rates. Individual code symbols are repeated to provide redundancy and to ensure that the rate at which encoded information is output from the transmitter is the same for each data rate. The resulting code symbol sequences are then covered at the symbol rate preferably using orthogonal Walsh codes. Accordingly, code symbol sequences produced at a first candidate rate are orthogonal to code symbol sequences produced at a second candidate rate. The code symbol repetition and covering method and apparatus disclosed herein is particularly advantageous in encoding data that contains long sequences of logical zeros and ones. The orthogonal nature of the code symbol sequences covered by orthogonal codes allows use of a more reliable and less complex data rate determination apparatus in the receiver. Rate determination is thereby improved resulting in an improvement in data service capability and a reduction in decoding errors.

One embodiment of the method and apparatus disclosed herein includes a data rate determination and decoding method and apparatus. The disclosed data rate determination decoding method and apparatus takes advantage of the orthogonal nature of the encoded sequences to distinguish between correct and incorrect assumptions as to the rate at which the data was transmitted (i.e., commonly referred to as "data rate hypotheses"). In one embodiment, symbol error rate (SER) estimators are used to generate rate-dependent SER metrics for each of the candidate rates. In this embodiment, each SER estimator receives a first input from an associated soft combiner and a second input from an associated re-encoder. Each SER estimator that is associated with a soft combiner that has used an incorrect data rate hypothesis will produce a high symbol error rate with respect to the symbol error rate produced by the SER estimator associated with the soft combiner using the correct rate hypothesis. The data rate distinguishing capability of the SER metrics is greatly improved by using orthogonal covering codes which further enhance the difference in the SER metrics between the correct and incorrect hypotheses.

In another embodiment of the data rate determination and decoding method and apparatus disclosed herein, energy metric calculators are used to generate rate-dependent re-encoded energy metrics for each candidate data rate. In this embodiment of the invention, the energy metric calculators perform an inner product of the re-encoded code sequences and soft decision sequence produced by the soft combiners, thereby producing an energy metric for each candidate rate. The inner product is generated by summing the products which result from multiplying the soft decision sequence output from a soft combiner on a code symbol-by-code symbol basis with the re-encoded code sequence. In accordance with this embodiment, the inner product is divided by the total number of symbols to produce an estimate of the symbol energy. The symbol energy is used as another data rate indicator. Due to the orthogonal nature of the Walsh cover codes of the method and apparatus disclosed herein, those soft combiners that have used incorrect rate hypotheses will produce energy metrics which are nearly zero. However, the soft combiner using the correct rate hypothesis produces an energy metric having a value that is substantially greater than zero. Therefore, in accordance with this embodiment, the energy metrics produced by the energy metric calculators can be used to distinguish between correct and incorrect data rate hypotheses.

In another embodiment of the symbol repetition and Walsh encoding method and apparatus disclosed herein, the block interleaver and repeater/covering blocks are repositioned with respect to one another depending upon communication link characteristics and implementation constraints. For example, by performing the block interleave function first, prior to the repeater/covering functions, orthogonal characteristics of the transmitted code symbol sequences are emphasized. However, the improvement in the orthogonal characteristics is balanced against degradation in the spatial diversity of the transmitted code symbols. In addition, for the higher data rates, it is more implementation efficient to perform the block interleave function first, prior to the repeater/covering functions. In contrast, by performing the block interleave function after the repeater/covering functions, the spatial diversity characteristics of the transmitted code symbols are emphasized. However, the improvement in spatial diversity is balanced against degradation of the orthogonal characteristics. In addition, for the lower data rates, it is more implementation efficient to perform the block interleave function after performing the repeater/covering functions. A combination of techniques is described which can accommodate a wide range of data rates.

BRIEF DESCRIPTION OF THE DRAWINGS

Like reference numbers and designations in the various drawings indicate like elements.

DETAILED DESCRIPTION OF THE INVENTION

Throughout this description, the preferred embodiment and examples shown should be considered as exemplars, rather than as limitations on the present invention.

The encoding, symbol repetition, and covering method and apparatus disclosed herein eases rate determination within the receiver in a communication system. The symbol repetition and encoding apparatus is typically implemented within transmitters of both base stations and mobile units that are designed for use in a communication system. The method and apparatus disclosed herein includes a decoding method and apparatus that cooperates with the disclosed repetition and encoding method and apparatus to accurately decode data at the transmitted data rate. The decoding method and apparatus disclosed herein is typically implemented in the receiver of both a base station and a mobile unit.

Figure 2:
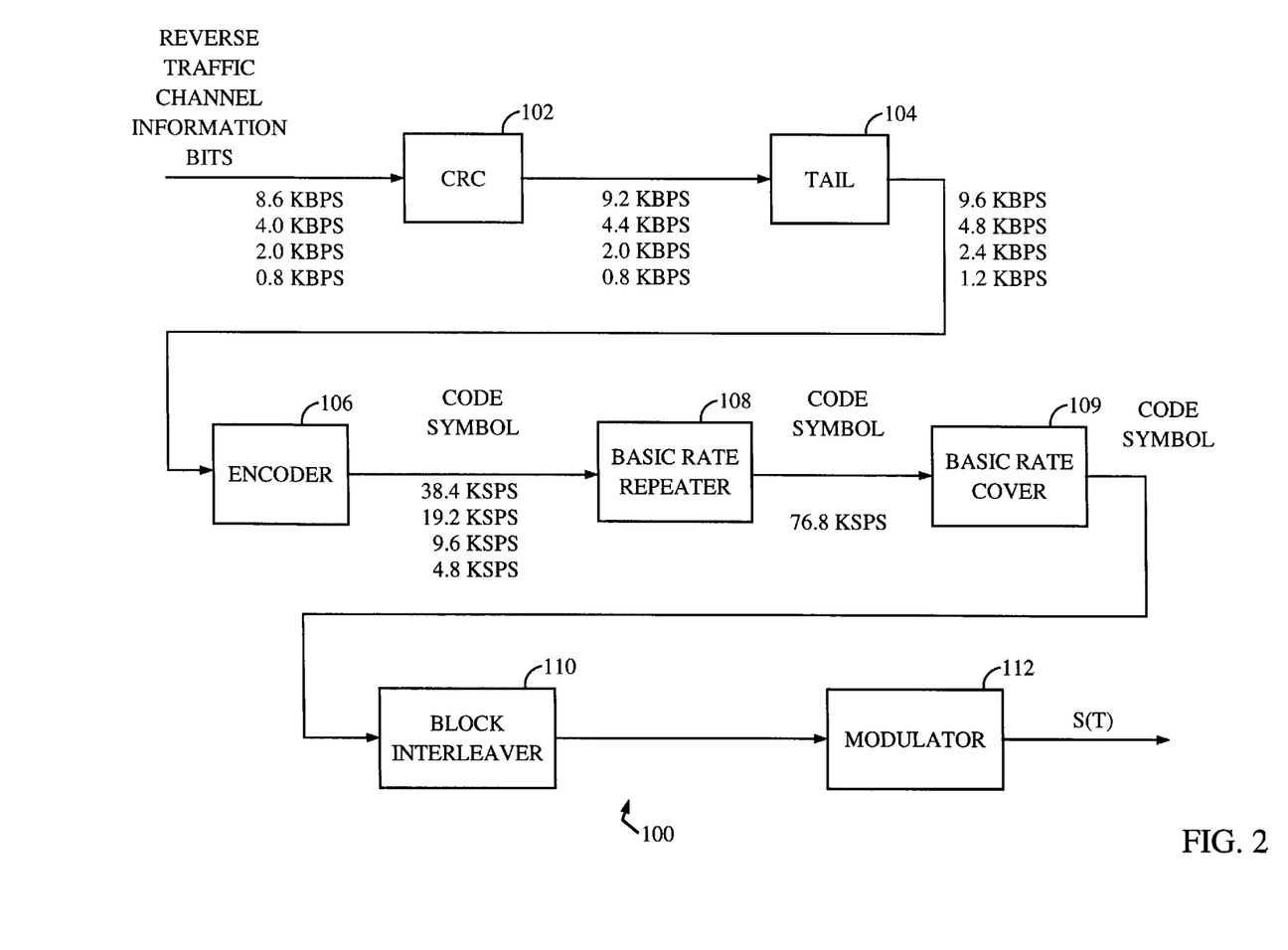
FIG. 2 shows the reverse link CDMA traffic channel of FIG. 1 adapted for use with the present invention.

The disclosed method and apparatus preferably uses rate-dependent codes to mask or "cover" the repeated code symbols before transmission from a transmitter to a receiver. In the preferred embodiment, the rate-dependent codes are orthogonal (such as Walsh codes) or approximately orthogonal. FIG. 2 shows a block diagram of the coherent reverse link code division multiple access (CDMA) traffic channel of FIG. 1 adapted for use with the method and apparatus disclosed herein. The code symbols are first repeated as described above with reference to the basic rate repeater 108 (FIG. 1). The code symbol repetition rate varies with the transmission data rate. For example, in one embodiment, the symbols are repeated 15, 7, 3, and 1 times for the rate 1/8 (i.e., each symbol appears 16 times), rate 1/4 (each symbol appears 8 times), rate 1/2 (each symbol appears four times) and rate 1 (each symbol appears twice) blocks respectively. However, irrespective of the transmission data rate, in accordance with the method and apparatus disclosed, after the code symbols are repeated, sequences of code symbols are masked or covered by a basic rate cover circuit 109. The basic rate cover circuit 109 preferably covers the repeated code symbols with an appropriate rate-dependent Walsh code running at the symbol rate. It should be noted that while the term "circuit" is used herein, it is well known that such cover may be provided by a programmable device, such as a digital signal processor or general purpose programmable microprocessor. One embodiment of the rate-dependent Walsh codes used to cover the code symbol sequences prior to transmission in the reverse link is shown in Table 1 below:

TABLE 1

Preferred Reverse Link Rate-Dependent Walsh Covers

| Data Rate | Label | Walsh Code Pattern |
| --- | --- | --- |
| 1 | $W_1^2$ | + − |
| 1/2 | $W_2^4$ | + + − − |
| 1/4 | $W_4^8$ | + + + + − − − − |
| 1/8 | $W_8^{16}$ | + + + + + + + + − − − − − − − − |

As used in Table 1, the label "$W_x^n$" represents the Walsh code "x" of an "n-ary" Walsh code space. $\overline{W}_x^n$ represents the negative of $W_x^n$. The "+" and "−" in the Walsh cover code represent a logical "0" and a logical "1", respectively. In one embodiment, rate 1 is the highest data rate that is covered using the method and apparatus disclosed herein. Rates 1/2, 1/4, and 1/8 are data rates which are one-half, one-quarter and one-eighth, respectively, of the rate 1 data rate. In one embodiment disclosed method and apparatus, rate 1 is equal to 9.6 kbps. Rates 1/2, 1/4, and 1/8 are therefore equal to 4.8, 2.4, and 1.2 kbps in this one embodiment. The disclosed method and apparatus is not limited to the four data rates shown in Table 1. Rather, the disclosed method and apparatus finds utility in a wide variety of communication systems using a wide variety of data rates. In addition, the embodiment described and shown in Table 1 uses binary Walsh cover codes which increase by a power of two for each sub-rate. However, one skilled in the art will appreciate that any number of Walsh cover codes can be used to practice the method and apparatus disclosed herein.

The rate-dependent Walsh covering codes disclosed herein are preferably orthogonal, or approximately orthogonal, to each other such that any code symbol produced by a first candidate rate preferably is substantially orthogonal to any code symbol produced by a second candidate rate. For example, the covering assignments shown in Table 1 are selected so that the resultant rate 1 code is orthogonal to the resultant rate 1/2 code. Similarly, the resultant rate 1/2 code preferably is orthogonal to the resultant rate 1/4 and rate 1/8 codes. This is so, even when the symbols contain runs of logical zeros and logical ones. The Walsh codes shown in Table 1 are useful for encoding data that often contains runs of zeros and ones and ensures mutual orthogonality between different data rate hypotheses independent of the code sequence. That is, attempts to decode such runs of ones or zeros using different data rate hypotheses will result in a relatively large disparity between the correct rate hypothesis and those hypotheses which are incorrect.

As shown in Table 1, rate 1 data is covered by the basic rate cover circuit 109 with a Walsh pattern of "+ −", or "0 1". Therefore, in accordance with Table 1, at rate 1, a logical "0" is encoded by the basic rate cover circuit 109 as "0 1" prior to transmission (rate=1, pattern=0 1). A logical "1" is encoded as "1 0" (rate 1, pattern=1 0). As shown in Table 1, rate 1/2 data preferably is covered with a Walsh pattern of "+ + − −", or "0 0 1 1". Thus, at data rate 1/2, a logical "0" is encoded by the basic rate cover circuit 109 as "0 0 1 1" while a logical "1" is encoded as "1 1 0 0". Rate 1/4 data preferably is covered with a Walsh pattern of "+ + + + − − − −", or "0 0 0 0 1 1 1 1". Thus at data rate 1/4, a logical "0" is encoded as "0 0 0 0 1 1 1 1" while a logical "1" is encoded as "1 1 1 1 0 0 0 0". Rate 1/8 data is covered with a Walsh pattern of "+ + + + + + + + − − − − − − − −", or "0 0 0 0 0 0 0 0 1 1 1 1 1 1 1 1". Thus, at data rate 1/8, a logical "0" is encoded as "0 0 0 0 0 0 0 1 1 1 1 1 1 1 1" while a logical "1" is encoded as "1 1 1 1 1 1 1 1 0 0 0 0 0 0 0 0". In accordance with one aspect of the method and apparatus disclosed herein, the Walsh code is selected from an 16-ary Walsh code space.

Due to the orthogonal nature of the encoded and covered sequences, the method and apparatus disclosed herein facilitates reliable rate determination in the receiver. The disclosed decoder and rate determination apparatus takes advantage of the orthogonal nature of the rate-dependent codes to accurately decode received data. Walsh covering codes are particularly advantageous in data services applications because runs of zeros and ones occur at a high frequency during the transmission of uncompressed and unencrypted data. Consequently, rate determination is improved because the decoder is much less likely to decode a first selected rate block (e.g., a rate ⅛ block) as a second selected rate block (e.g. a rate ¼ block), and vice versa. The improvements in rate determination provided by the method and apparatus disclosed herein become more apparent by describing how the Walsh covers are used in the receiver. One embodiment of the present decoder and rate determination apparatus that is designed to take advantage of the inventive Walsh cover codes is described below with reference to FIG. 3.

Rate Determination using Rate-dependent Walsh Covers

Figure 3:
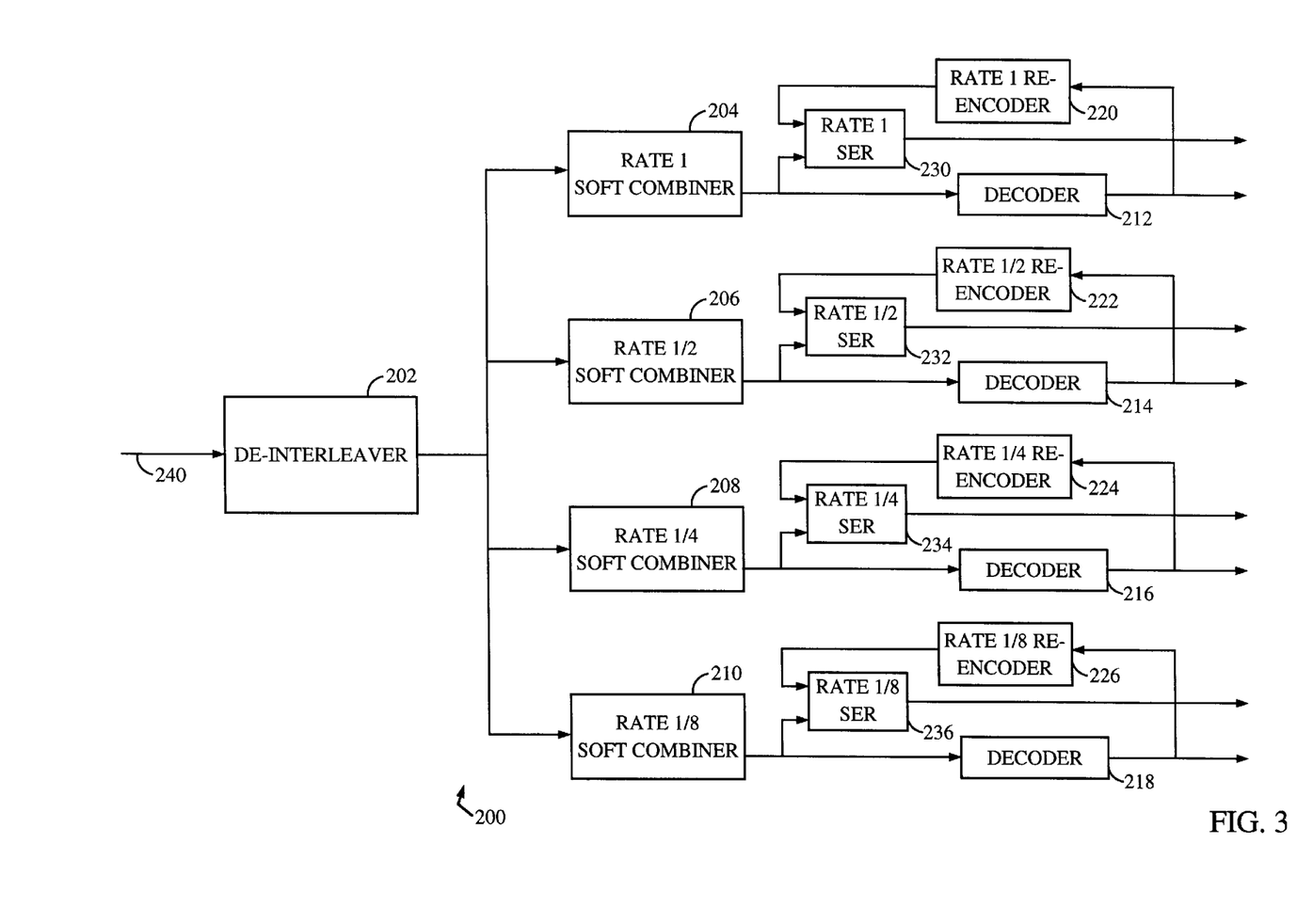
FIG. 3 is a block diagram of one embodiment of a decoder and rate determination apparatus in accordance with the present invention wherein symbol error rate metrics are used as data rate indicators.

One embodiment of the decoder and rate determination apparatus 200 disclosed herein is shown in FIG. 3. As shown in FIG. 3, the decoder and rate determination apparatus 200 comprises a "de-interleaver" 202 operatively connected in parallel to one or more matched filters or "soft combiners". The rate determination apparatus 200 has one soft combiner for each data rate that may be used in the wireless communication system. So, for example, as shown in FIG. 3, in one embodiment, the rate determination apparatus 200 includes a rate 1 soft combiner 204, a rate ½ soft combiner 206, a rate ¼ soft combiner 208 and a rate 18 soft combiner 210. The outputs of each soft combiner are connected to the inputs of identical decoders. For example, in the embodiment shown in FIG. 3, the outputs of the rate 1 soft combiner 204 are provided to the inputs of a decoder 212. Similarly, the outputs of the soft combiners 206, 208, and 210 are provided to the inputs of decoders 214, 216 and 218, respectively. The decoders 212, 214, 216 and 218 can be implemented using any well known decoding technique. In the embodiment shown in FIG. 3, the decoders are implemented with Viterbi decoders.

In the embodiment shown in FIG. 3, the decoder outputs are input to associated re-encoder. More specifically, the decoder 212 outputs are re-encoded by a rate 1 re-encoder 220 before being output to a first input of a rate 1 symbol error rate (SER) estimator 230. Similarly, the outputs of the decoders 214, 216, and 218 are re-encoded by a rate ½ re-encoder 222, a rate ¼ re-encoder 224, and a rate ⅛ re-encoder 226, respectively. The re-encoded data output by the rate ½ re-encoder 222, the rate ¼ re-encoder 224, and the rate ⅛ re-encoder 226 are provided to a first input of a rate ½ SER estimator 232, a rate ¼ SER estimator 234, and a rate ⅛ SER estimator 236, respectively. A second input of the SER estimators 230, 232, 234 and 236 are provided with the outputs of the soft combiner 204, 206, 208 and 210, respectively. The operation of the rate determination and decoding apparatus shown in FIG. 3 is now described in more detail.

Data provided to the input lines 240 of the de-interleaver 202 is first demodulated and filtered before it is input to the rate determination apparatus 200 of the present invention. The operation of the modulator and filter is well known and therefore is not described further. The demodulated and filtered soft decisions that represent information that was once adjacent in time (prior to transmission) are now separated in time due to the operation of the interleaver 110 in the transmitter (FIG. 2). Therefore, the de-interleaver 202 operates in a well-known manner to re-assemble or re-align in time the soft decisions that represent information that was once adjacent in time. In the embodiment of the invention shown in FIG. 3, the de-interleaver 202 outputs soft decisions that are re-ordered such that the soft decisions that represent information that was initially adjacent is once again adjacent and provides this information in parallel to the inputs of the soft combiners.

One soft combiner is provided for each rate hypothesis. The soft combiners function to undo the symbol repetition and covering functions in the transmitter to produce soft decision inputs for the decoder. The soft combiners "de-cover" the repeated code symbols which were originally covered by the rate cover circuit 109 in the transmitter using the orthogonal rate-dependent Walsh codes as described above with reference to FIG. 2. Each soft combiner shown in FIG. 3 performs a de-covering function by multiplying each soft decision by the Walsh covering code for its given rate and accumulating successive symbols to undo the repetition code. For example, the rate 1 soft combiner 204 multiplies the soft decisions by the Walsh cover code of "+ −". Similarly, the rate ½ soft combiner 206 multiplies the soft decisions by the Walsh cover code of "+ + − −" at the symbol rate. The rate ¼ soft combiner 208 multiplies the soft decisions by the Walsh cover code of "+ + + + − − − −". The rate ⅛ soft combiner 210 multiplies the soft decisions by the Walsh cover code of "+ + + + + + + + − − − − − − − −".

When data is transmitted at a given data rate only one of the soft combiners 204, 206, 208 or 210 will output the correct de-covered soft decisions. Because the Walsh cover codes of the present method and apparatus are orthogonal, the three soft combiners that use the wrong rate hypotheses will Have an approximately zero mean soft decision. In contrast, the soft combiner that uses the correct data rate hypothesis will output a soft decision sequence representing the originally encoded code sequence plus noise. As shown in FIG. 3, the outputs of the soft combiners are connected to the inputs of associated SER estimators and Viterbi decoders.

SER Metric for use in Rate Determination

As described below with reference to FIG. 3, the orthogonal rate-dependent Walsh cover codes of the present invention facilitate rate determination in the receiver by improving the rate determination power of at least two rate determination metrics: an SER metric, and an energy metric. The two rate determination metrics are described in turn.

In one embodiment of the present invention, the SER metric is generated by the rate re-encoder 220, 222, 224, and 226, working in cooperation with the rate SER estimators 230, 232, 234, and 236. Each rate soft combiner has an associated SER estimator, re-encoder, and decoder. For example, the output of rate 1 soft combiner 204 is provided to the rate 1 SER 230, the decoder 212, the output of which is provided to the rate 1 re-encoder 220. Each decoder decodes the soft decisions generated by its associated soft combiner using the well-known Viterbi algorithm. As shown in FIG. 3, the decoder outputs are fed back to their associated rate re-encoders. The rate re-encoders 220, 222, 224, and 226 re-encode the outputs of the decoders 212, 214, 216 and 218, respectively. The rate re-encoders re-encode the decoder outputs using the identical encoding technique used by the encoder 106 of FIG. 2. The re-encoded code symbols are provided to a first input of the SER estimator associated with each re-encoder.

Figure 4:
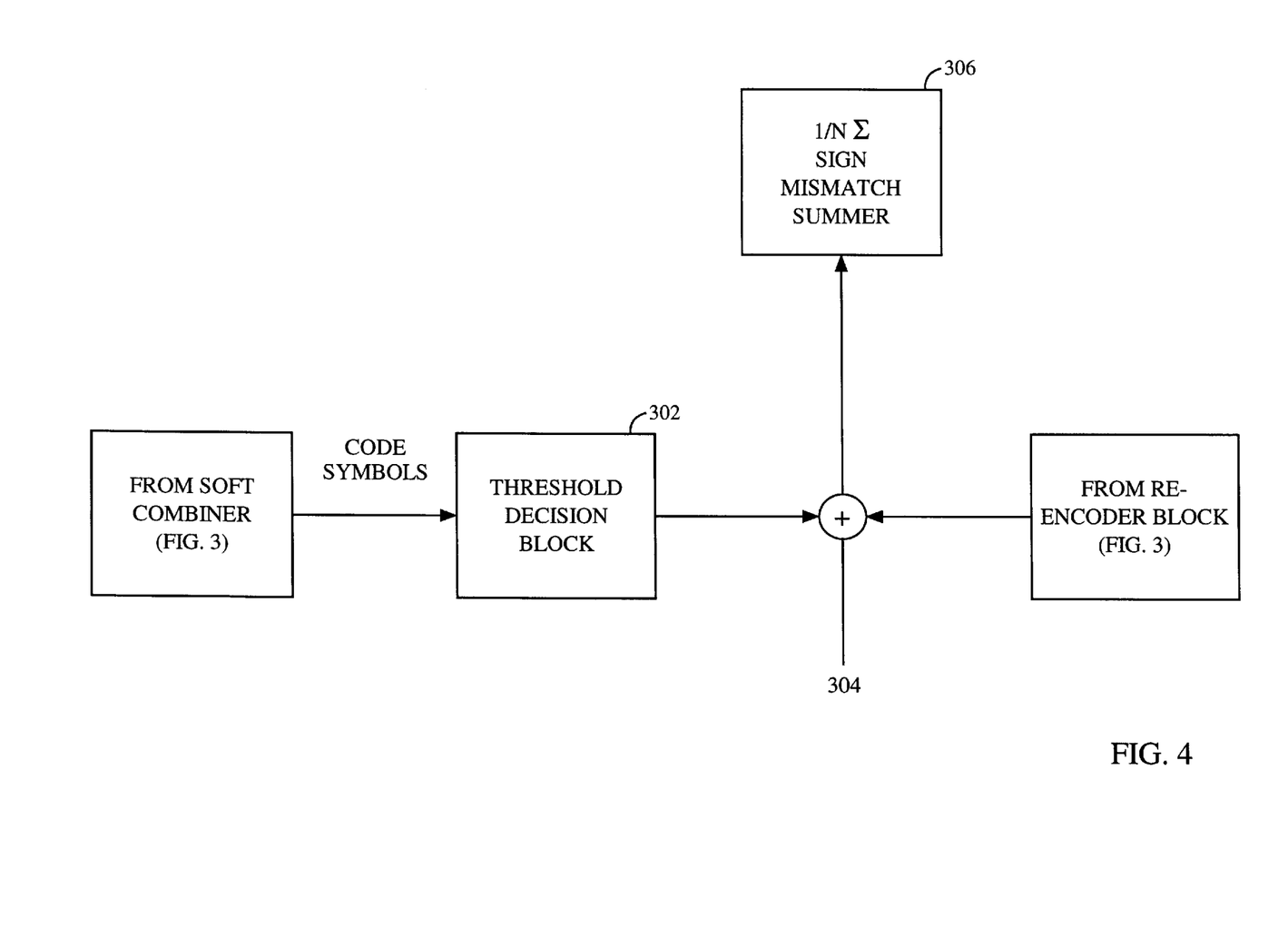
FIG. 4 is a block diagram of one embodiment of the symbol error rate (SER) block shown in FIG. 3.

The outputs of the soft combiners are provided to the second input of their associated SER estimators. Each SER estimator (230, 232, 234 and 236) compares the soft decisions output by its associated soft combiner with the re-encoded code symbols output by its associated re-encoder. In an ideal transmission channel environment (i.e., if the channel were noise-less and decoding the correct rate hypothesis), the soft decisions output by the soft combiners and input to the decoders would be identical to those re-encoded by their respective re-encoders yielding a zero SER. However, because noise exists in the transmission channel, noise is added to the soft decisions that are output by the soft combiners. Hence, the SER will be non-zero, even though the decoded code sequence is error free due. This is due to the introduction of errors into the soft decisions by noise and the error correction property of the code which corrects those introduced errors FIG. 4 shows one embodiment of the SER estimators of FIG. 3. The SER estimator preferably comprises a threshold decision circuit 302, an exclusive-OR ("XOR") gate 304, and a sign mismatch adder 306. It should be noted that the threshold decision circuit may be implemented in either hardware or software. As shown in FIG. 4, and in accordance with one embodiment of the method and apparatus disclosed herein, each SER estimator 230, 232, 234, 236 compares the signs of the soft decisions and re-encoded code symbols provided at the inputs to the estimator 230,232, 234,236. For example, the rate ½ SER estimator 232 compares the sign of each soft decision generated by the rate ½ soft combiner 206 with the sign of each re-encoded code symbol output from the rate ½ re-encoder 222. The sign soft decision is determined by performing a simple threshold decision function within the threshold decision circuit 302. Because the rate ½ re-encoder introduces a small time delay (the time necessary to re-encode the symbol), the soft decisions output by the soft combiner 206 are delayed for an identical delay period within the threshold decision circuit 302 before the sign comparisons are performed. In the embodiment shown in FIG. 4, the sign comparison function is implemented using a simple XOR gate 304.

If the sign of a soft decision and the associated re-encoded code symbol compared by the SER estimator 230,232,234, 236 is the same (e.g., they are both positive), an assumption is made that the soft decision was received without error. However, if the signs of the soft decision and the re-encoded code symbol do not match, it is assumed that the soft decision output from the soft combiner 204, 206, 208, 210 does not accurately represent the sequence that was transmitted due to the introduction of noise, fading, or other distortions in the transmission channel. The total number of sign mismatches detected is added together by the sign mismatch adder 306 to produce a total number of symbol errors. It should be noted that there is one such total for each adder 306 (i.e., for each rate hypothesis and associated soft combiner 204, 206, 208 and 210). By taking the total number of sign mismatches and dividing by the number of decoded code symbols compared (N), an SER rate is generated for each soft combiner 204, 206, 208 and 210 (and, consequently, for each rate).

As described above, because orthogonal codes are used to cover the code symbols prior to transmission, the soft combiners that use the wrong rate hypotheses generate zero mean AWGN signals at their outputs. The decoders attempt to decode the AWGN signals, and the re-encoders attempt to generate re-encoded code symbols based upon the AWGN signal. In general, the decoders will find the sequence which best maches the input AWGN signal. Therefore, because the output of the decoders is somewhat arbitrary, the probability that the signs of the incoming Gaussian noise signals and those of the re-encoded Gaussian noise signals will mismatch is relatively high. In contrast, the signs of the soft decisions output by the soft combiner using the correct rate hypothesis will much more frequently match those of its associated re-encoded code symbols. Therefore, the SER estimators associated with the soft combiners using the incorrect rate hypothesis will produce higher symbol error rates than will the SER estimator associated with the soft combiner using the correct rate hypothesis.

Rate determination can therefore be improved by using the SER outputs as a data rate indicator. The SERs allow the receiver to more readily differentiate between the rates. The higher the symbol error rate produced by an SER estimator, the more likely it is that an incorrect rate is being used to decode the soft decisions. In contrast, the lower the symbol error rate produced by an SER estimator, the more likely it is that the associated soft combiner is using the correct rate hypothesis.

Note that if the Walsh covering codes of the present method and apparatus were not used to cover the code symbols (as in the transmitter shown in FIG. 1) the SER estimators 230, 232, 234 and 236 would generate very similar symbol error rates for sequences containing long runs of zeros. The worst case is an all-zero code sequence. For example, consider the case when data is transmitted at rate __. When an all-zero sequence is transmitted, the rate __ soft combiner 206 generates a sequence of zeros (the zero sequence is simply repeated in this case, and not covered with the Walsh cover codes). Disadvantageously, all of the other soft combiners would also generate an all-zero sequence (because the input sequence was simply repeated and not covered using the Walsh covers). The all-zero sequences are decoded by the decoders and re-encoded by the re-encoders. Each SER estimator would match the signs of its respective input signals (because the all-zero sequence output by the encoders match the all-zero sequence output by the soft combiners), and each SER estimator would therefore indicate that their respective symbol error rate is approximately zero. Consequently, the symbol error rates could not be used as a reliable metric for rate determination in this case.

In contrast, by using the orthogonal Walsh cover codes of the present invention, only the soft combiner using the correct rate hypothesis will yield relatively small symbol error rates. The orthogonality of the Walsh covers force a zero mean AWGN signal to be generated by the soft combiners that use the incorrect rate hypotheses. This is especially useful when the input sequence is an all-zero sequence. Instead of inputting an all-zero sequence into the SER inputs (as described above and as would be produced by the prior art soft combiners), a zero mean AWGN signal is input. The Gaussian noise signals produced by the soft combiners using the incorrect rate hypotheses thereby produce higher symbol error rates than does the soft combiner using the correct rate hypothesis. In sum, improved rate differentiation can thereby be achieved using the rate-dependent Walsh covers of the present invention. The present invention uses the re-encoded code symbols to generate an estimate of the symbol error rates at the decoder inputs. Advantageously, the symbol error rate metric produced by the present invention can be used as an indicator to simplify the task of rate determination within the receiver.

Re-encoded Energy Metric for use in Rate Determination

Figure 5:
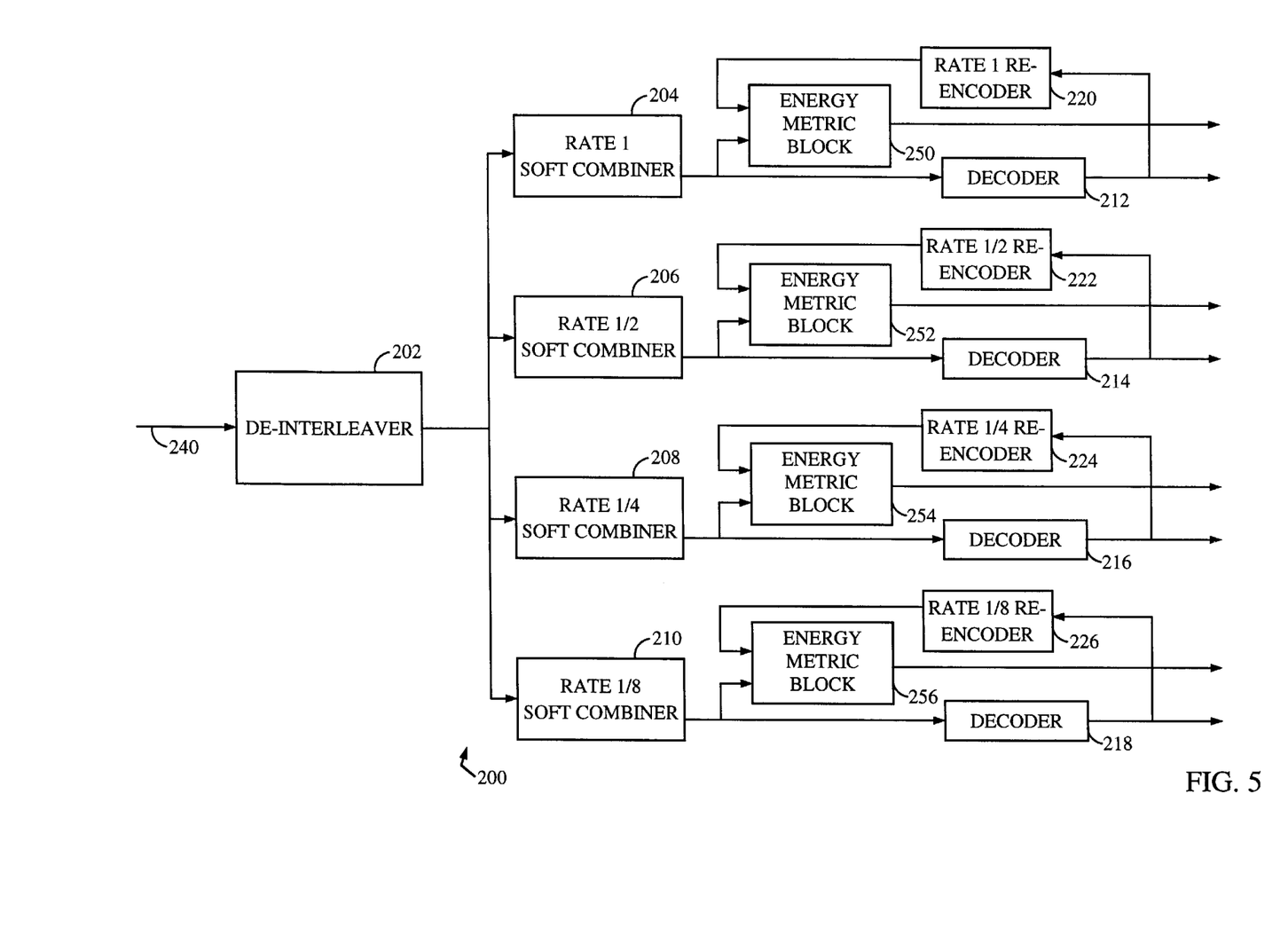
FIG. 5 is a block diagram of an embodiment of a decoder and rate determination apparatus in accordance with the present invention wherein re-encoded energy metrics are used as data rate indicators.

In addition to the SER metric described above, the rate-dependent Walsh cover codes of the present invention improve the reliability of using re-encoded energy metrics for performing rate determination. The re-encoded energy metric is generated in a manner that is similar to the generation of the SER metric described above with reference to FIG. 3. FIG. 5 shows an embodiment of a decoder and rate determination apparatus of the present invention that uses re-encoded energy metrics to facilitate rate determination. The apparatus 200 of FIG. 5 is identical to that shown in FIG. 3 with the exception that energy metric calculators 250, 252, 254 and 256 are substituted for the SER estimators 230, 232, 234 and 236, respectively. The energy metric calculators are used to project the re-encoded sequences that are output by the rate re-encoders back onto the soft decisions generated by the soft combiners, thereby producing a rate-dependent energy metric. As described below in more detail, each energy metric calculator produces a rate-dependent energy metric that can be used by the receiver to aid in the rate determination process. The energy metric therefore is yet another indicator that can used to differentiate between correct and incorrect rate hypotheses. The energy metric calculators are now described in more detail.

As described above with reference to FIG. 3, the outputs of the soft combiners are input to their associated decoders. The decoders may be implemented using any convenient well known decoding technique. For example, the decoders shown of FIG. 5 may be implemented using the well known Viterbi decoders. The soft combiner outputs are also provided to a first input of an associated energy metric calculator. The re-encoded code symbols (that are output by the rate re-encoders) are provided as input to a second input of the energy metric calculators. For example, as shown in FIG. 5, the output of the rate _ soft combiner 206 is connected both to a first input of the energy metric calculator 252 and to the Viterbi decoder 214. The Viterbi decoder 214 outputs are re-encoded by the rate _ re-encoder 222 and provided to a second input of the energy metric calculator 252.

The soft combiners 204, 206, 208 and 210 produce soft decisions that contain both sign and magnitude information. Hence they are commonly referred to as having "soft" decision values. As shown in FIG. 5, the soft decision values are input to both the energy metric calculators and the Viterbi decoders. The Viterbi decoders will attempt to find a sequence which matches the soft values, and the output of the Viterbi decoders is re-encoded by the rate re-encoders. The re-encoded code symbols are provided as input to associated energy metric calculators. The energy metric calculators project the re-encoded sequences generated by the rate re-encoders back onto the soft decision values output by the soft combiners. For example, as shown in FIG. 5, the energy metric calculator 250 projects the re-encoded sequences generated by the rate re-encoder 220 onto the soft decision values output by the soft combiner 204. Similarly, the energy metric calculators 252, 254 and 256 project the re-encoded sequences generated by the rate re-encoders 222, 224 and 226, respectively, back onto the soft decision values output by the soft combiners 206,208 and 210.

The re-encoded sequences are projected onto the combiner outputs within the energy metric calculators. The energy metric calculators perform an inner product of the re-encoded sequences and the soft decision values output by the soft combiners. The re-encoded sequences generated by each re-encoder are multiplied by the soft code values output by the soft combiner associated with the re-encoder. For example, the energy metric calculator 252 takes the re-encoded sequences generated by the rate _ re-encoder 222 and multiplies them by the associated soft code values generated by the rate _ soft combiner 206. The energy metric calculator 252 performs this multiplication on a symbol-by-symbol basis and sums the results, thereby producing an inner product. Each energy metric calculator divides this inner product by the total number of soft decisions (N) generated by its associated soft combiner, and then squares the result of the division. Each energy metric calculator thereby produces an estimate of the energy per soft decision ("$E_s$") that is output by its associated soft combiner.

The energy $E_s$ can be used as an additional indicator for rate determination purposes. As described below in more detail, due to the orthogonal nature of the Walsh covering codes of the present invention, the soft combiners that use an incorrect rate hypothesis will produce an energy metric near zero. In contrast, the soft combiner that uses the correct rate hypothesis will, under most conditions, produce an energy metric that is proportional to the square root of the energy $E_s$. The energy metric produced by the soft combiner using the correct rate hypothesis is distinguishable from zero and is therefore sufficiently distinguishable from the energy metrics produced by the soft combiners using incorrect rate hypotheses. Therefore, the energy metrics produced by each energy metric calculator 250, 252, 254 and 256 can be used to distinguish between correct and incorrect rate hypotheses.

As described above with reference to FIG. 3, due to the orthogonal nature of the present Walsh covering codes, the soft combiners that use the incorrect rate hypotheses output approximately zero-mean AWGN signals. When noise signals are input to the Viterbi decoder, the Viterbi decoder will attempt to find an encoder input coded sequence which best matches the noise. The energy metric is estimated by calculating the inner product of the noise sequence and the re-encoded sequence. Because the re-encoded sequences are weakly correlated with the soft decisions, the inner product of the re-encoded sequences with the soft combiner sequences will tend to cancel out. That is, the inner products of the AWGN outputs of the soft combiners and their associated re-encoded code symbol sequences will approach zero.

Due to the orthogonal nature of the Walsh covering codes, a significant amount of the energy of the AWGN signals generated by the soft combiners is thereby cancelled from the re-encoded energy metric. The inner products will not equal zero exactly, because the Viterbi decoder will find some correlation with the AWGN signals. Using the incorrect rate hypotheses, the energy will tend toward zero. In contrast, the soft combiner using the correct rate hypothesis will produce valid soft decisions at its output. As described above, these soft decisions are decoded, re-encoded, and projected back onto the code symbols to produce an energy metric. However, in this case, the re-encoded sequences will not cancel out the valid code symbols. Rather, as described above, the inner product will be proportional to the square root of the energy $E_s$. Consequently, the energy metric produced by the energy metric calculator using the correct rate hypothesis is distinguishable from those metrics generated using the incorrect rate hypotheses. Thus, by using the Walsh covering codes of the present method and apparatus in the transmitter, an energy metric associated with each available data rate can be generated by the receiver. The energy metrics can be used as yet another indicator to enable the receiver to distinguish between correct and incorrect rates hypotheses. One embodiment of the present invention has been described above with reference to FIGS. 2–5. FIG. 2 is a hardware implementation of the present Walsh covering and encoding invention adapted for use in a wireless transmitter. FIGS. 3–5 are hardware implementations of the present decoder and rate determination invention adapted for use in a wireless receiver. Those skilled in the telecommunication art will appreciate that the present invention can also be implemented in software executing on a processor or some other data sequencing device within the receiver and transmitter. More specifically, in one embodiment, the inventive Walsh covering and encoding method described above with reference to FIG. 2 executes on a microprocessor or other data processing device in the transmitter. Similarly, in one embodiment, the inventive rate determination and decoding method of the present invention executes on a microprocessor or other data processing device in the receiver. Alternatively, the methods can be implemented using any convenient or desirable sequencing device such as a state machine, present state-next state discrete logic, or field programmable gate array device.

A number of embodiments of the present invention have been described. Nevertheless, it will be understood that various modifications may be made without departing from the spirit and scope of the invention. For example, the basic rate repeater block 108 and the basic rate covering block 109 of FIG. 2 can be positioned either before the block interleaver 110 (as shown in FIG. 2) or after it. That is, the code symbols generated by the encoder 106 may first be repeated, covered with the Walsh cover codes of the present invention, and then interleaved (as shown in FIG. 2), or alternatively, they may be interleaved first, and then repeated and covered with the Walsh cover codes.

Figure 6:
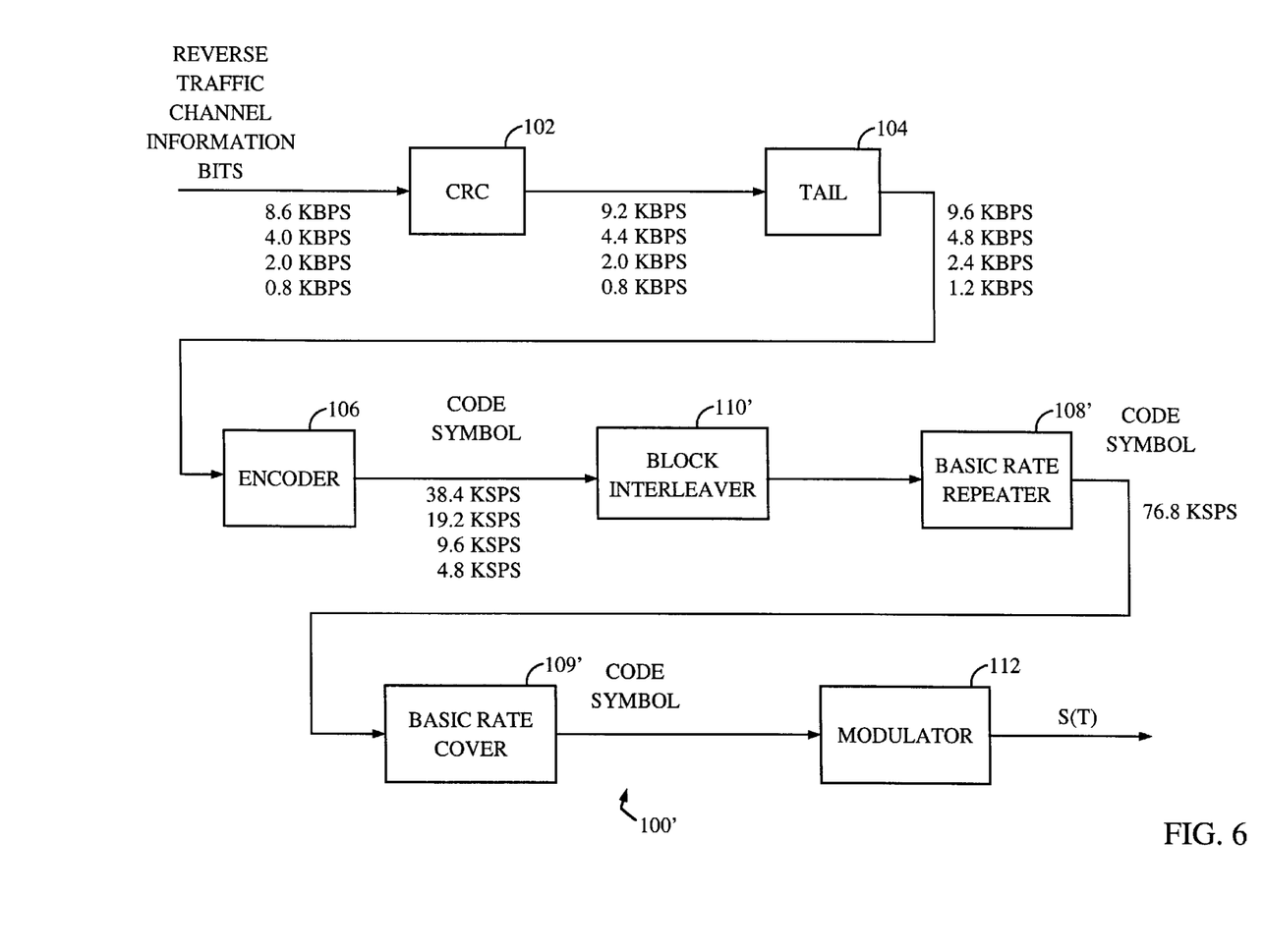
FIG. 6 shows the reverse CDMA traffic channel structure of FIG. 2 adapted for use with an alternative embodiment of the rate determination method and apparatus of the present invention.

An alternative embodiment of the reverse link CDMA traffic channel structure 100' is shown in FIG. 6. As shown in FIG. 6, the positions of the block interleaver 110' and the repeater/cover circuits 108', 109', are interchanged as compared to their relative positions in the traffic channel structure 100 of FIG. 2. Therefore, after the code symbols are generated by the encoder 106, they are first block interleaved by the block interleaver 110' before they are repeated by the repeater block 108' and covered by the cover circuit 109' using the method and apparatus described above with reference to FIGS. 2–5.

The decision to position the block interleaver before or after the repeater/cover function depends upon whether the orthogonal characteristics of the transmitted code symbols are more important than their diversity characteristics for a given system configuration. The transmission channel environment in which the transmitter and the receiver operate will determine which characteristics should be emphasized. For example, in a mobile environment, fading characteristics in the transmission channel will cause errors in the transmitted data. Therefore, in a mobile environment, the diversity characteristics of the transmitted symbols are likely more important than are their orthogonal characteristics. However, fading is much less a problem in a wireless local loop application.

Positioning the block interleaver after the basic rate repeater 108 and basic rate cover 109 (as shown in FIG. 2) improves the diversity characteristics of the transmitted codes. However, the improvement in diversity characteristics is balanced against degradation of the orthogonal characteristics of the transmitted code symbols. Should fading occur during transmission the orthogonal nature of the code symbols will be adversely affected. When the codes are de-interleaved and soft combined in the receiver, the resultant code symbols will be less orthogonal than they were at transmission due to the fading errors. However, this degradation in orthogonality may be acceptable in an environment where diversity should be emphasized.

In contrast, placing the block interleaver 110' before the basic rate repeater 108' and basic rate cover 109' (as shown in FIG. 6) improves the orthogonal characteristics of the transmitted codes. However, the improvement in the orthogonal characteristics is balanced against degradation of the diversity characteristics of the transmitted code symbols. Should fading occur during transmission entire code symbols may be lost. However, the reduction in diversity may be acceptable in environments where diversity is less important.

In addition, implementation considerations associated with the data rates supported by the channel will also play a role in determining where to position the two functions. For the higher data rates, it is more implementation efficient to position the block interleaver 110' before the repeater 108' and the cover circuit 109' as shown in FIG. 6. In contrast, for the lower data rates, it is more implementation efficient to position the block interleaver 110 after the repeater and cover circuits, 108 and 109, respectively, as shown in FIG. 2.

Figure 7:
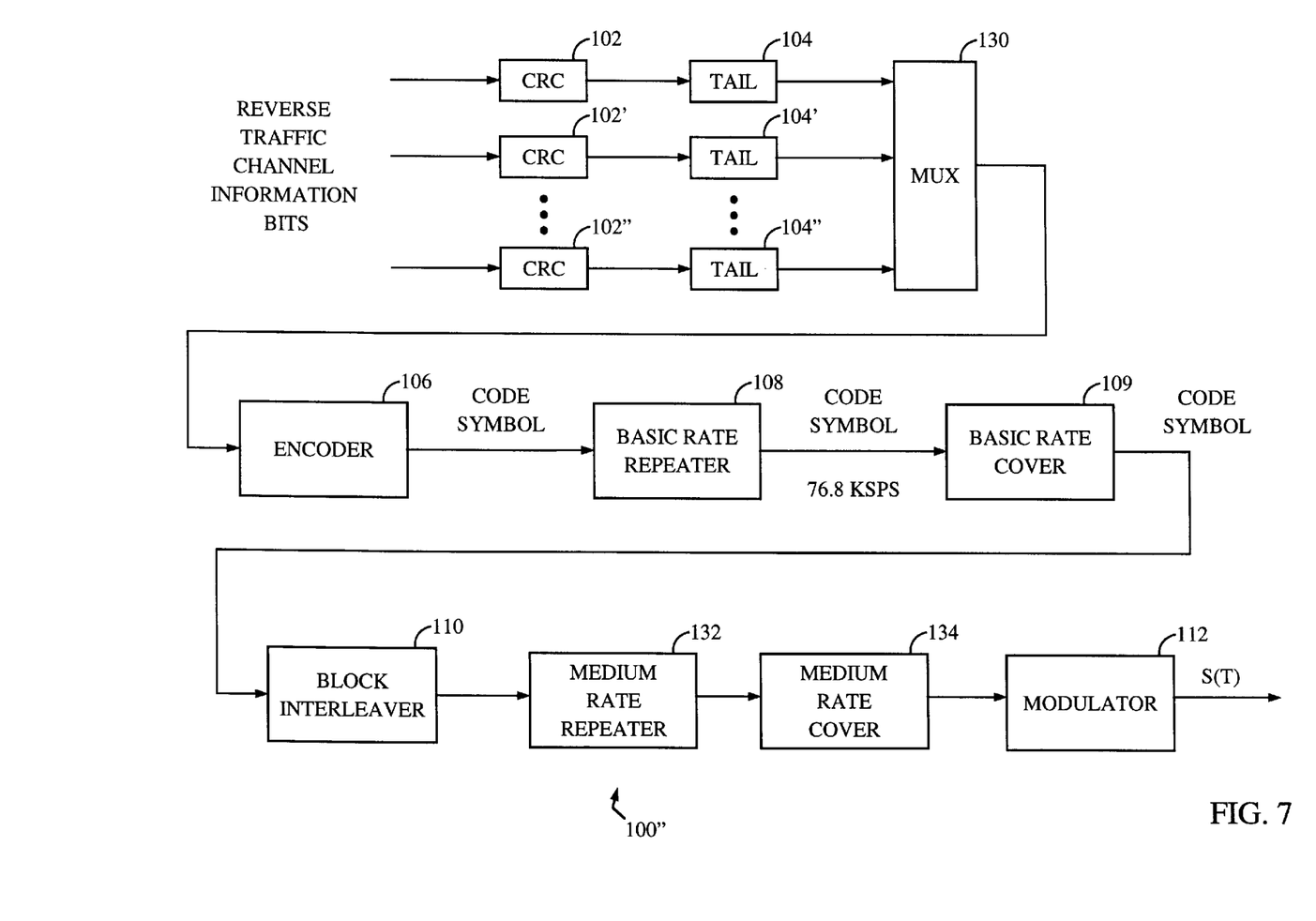
FIG. 7 shows an alternative embodiment of a coherent reverse link CDMA traffic channel adapted for use with the present invention.

An alternative embodiment of a coherent reverse link CDMA traffic channel 100" adapted for use with the present invention is shown in FIG. 7. As shown in FIG. 7, in order to achieve higher bit rates (multiples of the rate 1 bit rate), multiple rate 1 blocks are packed into a single frame. As described above with reference to FIGS. 1 and 2, the information bits are appended with CRC and tail bits by the CRC blocks (e.g., 102, 102', etc.) and the Tail blocks (e.g., 104, 104', etc.), respectively. The blocks are multiplexed together into a single stream by mutiplexer 130. As described above, the data is then encoded by the encoder 106 and repeated for the basic rates (rates $\frac{1}{8}$, $\frac{1}{4}$, $\frac{1}{2}$ and 1) by the basic rate repeater 108. The repeated codes are then covered by the basic rate cover 109 as described above to make the basic rate codes orthogonal. The covered codes are then bit interleaved using the bit reversal block interleaver 110. Then, in order to reduce the implementation complexity, the higher rate codes are repeated using the medium rate repeater 132. The codes are increased to a symbol rate of 12,288 symbols per frame. The codes are covered by the medium rate cover 134 to make all of the rate codes orthogonal. In theory, the covering blocks (109 and 130) could be implemented in one block before the block interleaver 110. However, such an arrangement would make the block interleaver undesirably large. Therefore, the covering functions are preferably separated as shown (one for the lower rates, one for the higher rates).

In summary, the invention described above includes a means for repeating and covering code symbols with orthogonal rate-dependent Walsh cover codes prior to transmission over a communication link. The present invention also includes a means for decoding and determining the data rate at which the code symbols are transmitted. The present invention advantageously improves data rate determination and reduces error rates associated with the decoding process. By improving decode reliability, the present invention also advantageously permits operation at reduced signal-to-noise ratios (SNR) which, in turn, increases system capacity. Improvements in reliability reduce latency of transport protocols, which provides reliable end-to-end links using ARQ schemes. The present invention is particularly useful in wideband wireless digital communication systems such as CDMA systems, however it also finds utility in other digital communication systems.

Although one particular set of rate-dependent orthogonal Walsh cover codes is described, those skilled in the art appreciate that a number of alternative codes can be used to practice the present invention. For example, the present invention can be practiced using covers that are not strictly orthogonal, yet have low cross-correlation. One example is referred to in the art as "gold" codes. Quasi-orthogonal codes that are substantially orthogonal can also be used to practice the present invention. In addition, the present invention has been described above with reference to the preferred reverse link Walsh cover codes. In one embodiment of the present invention, the forward link may use a slightly different set of Walsh cover codes to ensure backward compatibility with previous CDMA communication systems (e.g., those conforming with IS-95). In this embodiment, the forward link uses the Walsh cover codes shown below in Table 2.

TABLE 2

Forward Link Rate-Dependent Walsh Covers

| Data Rate | Label | Walsh Code Pattern |
|---|---|---|
| 1 | $W_0^1$ | + |
| 1/2 | $W_1^2$ | + − |
| 1/4 | $W_2^4$ | + + − − |
| 1/8 | $W_4^8$ | + + + + − − − − |

As used in Table 2, the label "$W_x^n$" represents the Walsh code "x" of an "n-ary" Walsh code space. $\overline{W}_x^n$ represents the negative of $W_x^n$. The forward link Walsh covers are from an 8-ary Walsh code space. The Walsh codes are chosen for two reasons. First, the assignments are chosen so that rates less than rate 1 are mutually orthogonal. Second, the assignments are chosen so that the rate 1 code is mutually orthogonal to all other rates when the rate 1 frame contains a run of zeros or ones. As a result of the Walsh code covering using the Walsh codes shown in Table 2, the decoder is less likely to mistake a higher rate block having runs of zeros or ones for a lower rate block having runs of zeros or ones. As described above, this is important during data transmissions, because runs of zeros and ones occur frequently during the transmission of uncompressed and unencrypted data. In addition, using the Walsh cover codes shown in Table 2, the decoder is much less likely to decode a less than rate 1 block as another less than rate 1 block.

As described above, in one embodiment, the method and apparatus uses orthogonal binary Walsh cover codes to encode code symbols prior to transmission. The binary Walsh cover codes increase in length by powers of two for each data transmission sub-rate used by the transmitter. The present invention decodes the encoded code symbols by deriving SER and re-encoded energy metrics that aid in rate determination in the receiver. Other rate-dependent metrics, such as state metric re-normalization of the Viterbi decoders, can be used to aid in the rate determination process when Viterbi decoders are used in implementing the present invention.

Accordingly, it is to be understood that the invention is not to be limited by the specific illustrated embodiment, but only by the scope of the appended claims.

What is claimed is:

1. A method of determining data rates of code symbols transmitted over a communication link, wherein the code symbols are repeated a predetermined number of times per symbol depending upon the data rate used for transmission, and wherein the code symbols are transmitted at a selected one of a plurality of available data rates, comprising the steps of:

a) covering the code symbols with a selected one of a plurality of rate dependent orthogonal Walsh covering codes, each such Walsh covering code being associated with a unique data rate;
 b) transmitting the covered code symbols over the communication link at the selected date rate;
 c) deriving rate-dependent metrics based upon the transmitted covered code symbols; and
 d) determining the selected data rate based upon the derived rate-dependent metrics.

2. The data rate determination method of claim 1, wherein the rate-dependent Walsh covering codes are selected from an 16-ary Walsh code space.

3. The data rate determination method of claim 1, wherein the rate-dependent Walsh covering codes are binary.

4. The data rate determination method of claim 3, wherein the rate-dependent Walsh covering codes comprise binary codes that increase by powers of two for each successive data sub-rate.

5. The data rate determination method of claim 1, wherein the communication link comprises a radio link.

6. The data rate determination method of claim 5, wherein the communication link is part of a digital cellular communication system.

7. The data rate determination method of claim 6, wherein the digital cellular communication system is a Code Division Multiple Access (CDMA) system.

8. The data rate determination method of claim 1, wherein the rate-dependent orthogonal Walsh covering codes have values of $W_x^n$, and wherein $W_x^n$ represents the Walsh code "x" of an "n-ary" Walsh code space.

9. The data rate determination method of claim 8, wherein $\overline{W}_x^n$ represents the negative of $W_x^n$.

10. The data rate determination method of claim 8, wherein the Walsh covering codes have the following values for four pre-determined data rates comprising date rate 1,½,¼, and ⅛

| Data Rate | Value | Walsh Code Pattern |
|---|---|---|
| 1 | $W_1^2$ | + − |
| 1/2 | $W_2^4$ | + + − − |
| 1/4 | $W_4^8$ | + + + + − − − − |
| 1/8 | $W_8^{16}$ | + + + + + + + + − − − − − − − − |

11. The rate determination method of claim 10, wherein "+" represents a logical zero, and wherein "−" represents a logical one.

12. The rate determination method of claim 10, wherein rate 1 comprises 9.6 kbps, rate ½ comprises 4.8 kbps, rate ¼ comprises 2.4 kbps, and rate ⅛ comprises 1.2 kbps.

13. The rate determination method of claim 1, wherein one of the derived rate-dependent metrics is a symbol error rate (SER) metric.

14. The rate determination method of claim 13, wherein an SER metric is derived for each available data rate.

15. The rate determination method of claim 14, wherein the step of deriving the SER metric comprises:

a) de-interleaving the transmitted covered code symbols and providing the de-interleaved code symbols as inputs to a plurality of soft combiners, wherein each available data rate has an associated and respective soft combiner;
 b) combining the de-interleaved code symbols for each available data rate;

c) decoding the combined code symbols;

d) re-encoding the decoded code symbols;

e) comparing the combined code symbols with the re-encoded code symbols on a symbol-by-symbol basis; and f) generating an SER for each available data rate based upon the comparison made in step e).

16. The rate determination method of claim 1, wherein one of the derived rate-dependent metrics is a re-encoded energy metric.

17. The rate determination method of claim 16, wherein the re-encoded energy metric is derived for each available data rate.

18. The rate determination method of claim 17, wherein the step of deriving the re-encoded energy metric comprises:

a) de-interleaving the transmitted covered code symbols and providing the de-interleaved code symbols as inputs to a plurality of soft combiners, wherein each available data rate has an associated and respective soft combiner;

b) combining the de-interleaved code symbols for each available data rate;

c) decoding the combined code symbols;

d) re-encoding the decoded code symbols;

e) projecting the re-encoded code symbols onto the combined code symbols on a symbol-by-symbol basis; and f) generating an energy metric for each available data rate based upon the comparison made in step e.

19. The rate determination method of claim 18, wherein the projection step e) comprises performing an inner product of the re-encoded code symbols and the combined code symbols on a symbol-by-symbol basis.

20. The rate determination method of claim 19, wherein the generating step f) comprises summing the inner products for the total number of code symbols, and dividing the sum by the total number of code symbols thereby generating an estimate of the energy per symbol $E_s$ for each available data rate.

21. The rate determination method of claim 14, wherein the SER metrics are used to distinguish between correct and incorrect data rate hypotheses.

22. The rate determination method of claim 21, wherein the incorrect data rate hypotheses produce SER metrics that are distinguishably greater than the SER metric produced by the correct data rate hypothesis.

23. The rate determination method of claim 17, wherein the re-encoded energy metrics are used to distinguish between correct and incorrect data rate hypotheses.

24. The rate determination method of claim 23, wherein the incorrect data rate hypotheses produce re-encoded energy metrics approaching zero, and wherein the re-encoded energy metric produced by the correct data rate hypothesis is distinguishably greater than zero.

25. A rate determination apparatus adapted for use in a communication system having a communication link, comprising:

a) means for covering code symbols with a selected one of a plurality of rate-dependent orthogonal Walsh covering codes, each such Walsh covering code being associated with a unique data rate;

b) means, operatively connected to the covering means, for transmitting the covered code symbols over the communication link at a selected available data rate associated with the selected one Walsh covering code;

c) means, responsive to the transmitting means, for deriving rate dependent metrics based upon the transmitted code symbols; and d) means, responsive to the deriving means, for determining the selected available data rate based upon the metrics derived.

26. A system for performing rate determination in a communication system having a communication link, wherein code symbols are transmitted over the communication link at a selected one of a plurality of available data rates, comprising:

a) a symbol repetition and encoding block wherein code symbols are repeated and covered with a selected one of a plurality rate-dependent orthogonal Walsh covering codes, each such Walsh covering code being associated with a unique data rate;

b) means, operatively connected to the symbol repetition and encoding block, for transmitting the covered code symbols over the communication link at the selected available data rate associated with the selected one Walsh covering code;

c) a plurality of soft combiners in wireless communication with the transmitting means, wherein each soft combiner has a respective data rate associated thereto, and wherein the soft combiners output de-interleaved combined code symbol sequences;

d) a plurality of Viterbi decoder and rate re-encoder pairs operatively connected to respective associated soft combiners, wherein the rate re-encoders output re-encoded code symbols;

e) a plurality of symbol error rate (SER) blocks having a first input that is operatively connected to a respective associated soft combiner and having a second input that is operatively connected to a respective associated re-encoder output, wherein each SER estimator generates an SER metric by comparing, on a symbol-by-symbol basis, code symbols generated by its associated soft combiner with code symbols generated its associated re-encoder; and f) means, responsive to the SER estimators, for determining the selected available data rate based upon the SER metrics generated by the SER estimators.

27. A system for performing rate determination in a communication system having a communication link, wherein code symbols are transmitted over the communication link at a selected one of a plurality of available data rates, comprising:

a) a symbol repetition and encoding block wherein code symbols are repeated and covered with a selected one of a plurality rate-dependent orthogonal Walsh covering codes, each such Walsh covering code being associated with a unique data rate;

b) means, operatively connected to the symbol repetition and encoding block, for transmitting the covered code symbols over the communication link at the selected available data rate associated with the selected one Walsh covering code;

c) a plurality of soft combiners in wireless communication with the transmitting means, wherein each soft combiner has a respective data rate associated thereto, and wherein the soft combiners output de-interleaved combined code symbol sequences;

d) a plurality of Viterbi decoder and rate re-encoder pairs operatively connected to respective associated soft combiners, wherein the rate re-encoders output re-encoded code symbols;

e) a plurality of energy metric calculators having a first input that is operatively connected to a respective associated soft combiner and having a second input that is operatively connected to a respective associated re-encoder output, wherein each energy metric calculator generates an energy metric by multiplying, on a symbol-by-symbol basis, code symbols generated by its associated soft combiner and code symbols generated by its associated re-encoder; and f) means, responsive to the energy metric calculators, for determining the selected available data rate based upon the energy metrics generated by the energy metric calculators.

28. A computer program executable on a general purpose computing device, wherein the program is capable of determining data rates of code symbols transmitted over a communication link, wherein the code symbols are repeated a pre-determined number of times per symbol depending upon the data rate used for transmission, and wherein the code symbols are transmitted at a selected one of a plurality of available data rates, comprising:

a) a first set of instructions for covering the code symbols with a selected one of a plurality of rate-dependent orthogonal Walsh cover codes, each such Walsh covering code being associated with a unique data rate;

b) a second set of instructions for deriving rate-dependent metrics based upon the covered code symbols; and c) a third set of instructions for determining the selected transmission data rate based upon the derived rate-dependent metrics.

29. The computer program of claim 28, wherein the program is executed by a general purpose computing device in a mobile station.

30. The computer program of claim 28, wherein the program is executed by a general purpose computing device in a base station.

31. The computer program of claim 28, wherein the program executes in a field programmable gate array device.

* * * * *

UNITED STATES PATENT AND TRADEMARK OFFICE
CERTIFICATE OF CORRECTION

PATENT NO. : 6,147,964
DATED : November 14, 2000
INVENTOR(S) : Black, et al.

It is certified that error appears in the above-identified patent and that said Letters Patent is hereby corrected as shown below:

Column 7,
Line 37, delete "18" and insert -- 1/8 --.

Signed and Sealed this

Sixth Day of November, 2001

Attest:

*Nicholas P. Godici*

NICHOLAS P. GODICI
*Attesting Officer*   *Acting Director of the United States Patent and Trademark Office*